US005576163A

United States Patent [19]

Anderson et al.

[11] Patent Number: 5,576,163

[45] Date of Patent: Nov. 19, 1996

[54] IMAGING ELEMENT HAVING A PROCESS-SURVIVING ELECTRICALLY-CONDUCTIVE LAYER WITH POLYESTERIONOMET BINDER

[75] Inventors: Charles C. Anderson, Penfield; Mario D. DeLaura, Hamlin, both of N.Y.

[73] Assignee: Eastman Kodak Company, Rochester, N.Y.

[21] Appl. No.: 625,118

[22] Filed: Apr. 1, 1996

[51] Int. Cl.$^6$ .................... G03C 1/89; B32B 27/06; C08K 3/10; H01B 1/06

[52] U.S. Cl. .................... 430/529; 430/530; 430/626; 252/518; 428/482; 524/408

[58] Field of Search .................... 430/527, 529, 430/530, 626; 428/482; 252/518; 524/408

[56] References Cited

U.S. PATENT DOCUMENTS

| | | | |
|---|---|---|---|
| 4,203,769 | 5/1980 | Guestaux | 430/628 |
| 5,006,451 | 4/1991 | Anderson et al. | 430/530 |
| 5,096,975 | 5/1992 | Anderson et al. | 430/529 |
| 5,198,499 | 3/1993 | Anderson et al. | 430/527 |
| 5,203,884 | 4/1993 | Buchanan et al. | 51/295 |
| 5,221,598 | 6/1993 | Anderson et al. | 430/527 |
| 5,322,761 | 6/1994 | Kausch et al. | 430/273 |
| 5,360,706 | 11/1994 | Anderson et al. | 430/530 |
| 5,372,985 | 12/1994 | Chang et al. | 503/201 |
| 5,407,603 | 4/1995 | Morrison | 430/527 |
| 5,424,269 | 6/1995 | Chang et al. | 503/227 |
| 5,427,835 | 6/1995 | Morrison et al. | 430/527 |
| 5,439,785 | 8/1995 | Boston et al. | 430/530 |
| 5,468,498 | 11/1995 | Morrison et al. | 524/408 |

*Primary Examiner*—Richard L. Schilling
*Attorney, Agent, or Firm*—Alfred P. Lorenzo

[57] ABSTRACT

Imaging elements, such as photographic, electrostatographic and thermal imaging elements are comprised of a support, an image-forming layer and an electrically-conductive layer comprised of a vanadium pentoxide colloidal gel, a polyesterionomer binder and a methoxyalkylmelamine. The electrically-conductive layer exhibits electrical conductivity which is both process-surviving and essentially independent of humidity.

15 Claims, No Drawings

IMAGING ELEMENT HAVING A PROCESS-SURVIVING ELECTRICALLY-CONDUCTIVE LAYER WITH POLYESTERIONOMET BINDER

FIELD OF THE INVENTION

This invention relates in general to imaging elements, such as photographic elements, and in particular to imaging elements comprising a support, an image-forming layer and an electrically-conductive layer. More specifically, this invention relates to imaging elements having an electrically-conductive layer whose electrical conductivity is process-surviving and essentially independent of humidity.

BACKGROUND OF THE INVENTION

The problem of controlling static charge is well known in the field of photography. Static charging may occur due to various factors in the manufacture, finishing, and use of photographic elements. The accumulation of static charges can result in fog patterns in photographic emulsions, various coating imperfections such as mottle patterns and repellency spots, dirt and dust attraction which may result in the formation of "pinholes" in processed films, and a variety of handling and conveyance problems.

To overcome the problem of accumulation of static charges it is conventional practice to provide an antistatic layer in photographic elements. Many antistatic agents have been utilized for this purpose. For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and an alkyl-substituted trifunctional aziridine crosslinking agent is disclosed.

It is known to prepare an antistatic layer from a composition comprising a vanadium pentoxide colloidal gel as described, for example, in U.S. Pat. No. 4,203,769. Antistatic layers containing vanadium pentoxide provide excellent protection against static and are highly advantageous in that they have excellent transparency and their performance is not significantly dependent on humidity. The excellent performance of these antistatic layers results from the particular morphology of this material. The colloidal vanadium pentoxide gel consists of entangled, high aspect ratio, flat ribbons about 50–100 angstroms wide, about 10 angstroms thick and about 1000–10000 angstroms long. Low surface resistivities can be obtained with very low vanadium pentoxide coverages as a result of this high aspect ratio morphology.

Typically, the vanadium pentoxide is coated in a polymeric binder to improve adhesion to adjacent layers and to improve the durability of the antistatic layer. Polyesterionomer dispersions, which are preferred binders because they exhibit excellent film-forming properties and compatibility with vanadium pentoxide, have recently been disclosed for use in aqueous-based, vanadium pentoxide-containing antistat coating formulations. For example, an element comprising a support, at least one imaging layer, and an antistat layer comprising vanadium pentoxide in a polyesterionomer binder containing carboxyl groups, alkali metal carboxylate groups, sulfonic acid groups, or alkali metal sulfonate groups is described in U.S. Pat. No. 5,360,706. An imaging element for use in electrostatography containing an electroconductive layer comprising vanadium pentoxide dispersed in a polymer binder such as a polyesterionomer dispersion is described in U.S. Pat. No. 5,380,584. Antistatic layers containing vanadium pentoxide in sulfopolymer binders, including sulfopolyesters are described in U.S. Pat. Nos. 5,203,884, 5,322,761, 5,372,985, 5,407,603, 5,424,269, 5,427,835, 5,439,785, and 5,468,498.

It is known to overcoat a vanadium pentoxide antistatic layer with a hydrophobic, protective overcoat or barrier layer to prevent the dissolution of the antistatic material in film processing solutions which would otherwise result in a diminution of the antistatic properties. Such barrier layers are described in U.S. Pat. Nos. 5,006,451 and 5,221,598, for example. However, the need to overcoat a vanadium pentoxide layer with a barrier layer has several potential disadvantages. These include the following:

(1) An additional layer must be coated and dried. This increases both manufacturing complexity and cost.

(2) In some critical applications it may be desirable to have the antistatic layer serve as the surface layer since there may be some loss in the effectiveness of the antistat properties when the conductive layer is buried below an electrically-insulating, barrier layer.

(3) When a protective overcoat for the antistatic layer is desired to provide other properties such as friction control, abrasion resistance, ferrotyping and blocking resistance, etc., the choice of materials for the protective overcoat is limited by the need for the layer to also serve as a barrier layer.

(4) It may be desirable to overcoat the antistatic layer with a water (or film processing solution) permeable, hydrophilic layer such as a curl control layer or pelloid layer. However, such permeable layers can not prevent the dissolution of the vanadium pentoxide.

As mentioned hereinabove, it is known from U.S. Pat. No. 5,360,706 to form an antistatic layer of an imaging element by dispersing electrically-conductive colloidal vanadium pentoxide in a polyesterionomer binder. As described in the '706 patent, use of a polyesterionomer binder provides improved coating solution stability and enhanced interlayer adhesion. However, a hydrophobic protective overcoat is required to obtain process-surviving antistatic protection.

It is known from U.S. Pat. No. 5,427,835 to form antistatic layers from an aqueous-based mixture comprising colloidal vanadium pentoxide and a dispersed sulfonated polymer but such mixtures lack the degree of process-surviving capability desired in imaging elements.

It is known from. U.S. Pat. No. 5,096,975 to form an antistatic layer of an imaging element from a combination of a copolymer of vinylbenzene sulfonic acid and a methoxyalkylmelamine crosslinking agent. As described in the '975 patent, this combination provides process-surviving antistatic protection. However, the conductive properties are humidity dependent.

For many imaging elements, and especially photographic films and papers, it is important that the electrically-conductive properties be essentially independent of humidity. Thus, for example, photothermographic elements are typically developed by heating in a high temperature processing chamber in which relative humidity is very low and a layer which is electrically-conductive only under conditions of high relative humidity is entirely unsatisfactory. Equally important for many imaging elements is the requirement that the electrical conductivity be process-surviving. Thus, for example, the electrically-conductive layer must not dissolve in a developing solution or other solutions employed in processing the imaging element. If the electrically-conductive layer is an outermost layer, it is also highly desirable that it resist softening or becoming tacky as a result of contact with processing baths as a soft and tacky surface is easily damaged and prone to dirt pickup in processing equipment.

It is toward the objective of providing an improved electrically-conductive layer for imaging elements whose conductivity is both process-surviving and humidity-independent that the present invention is directed.

SUMMARY OF THE INVENTION

In accordance with this invention, an imaging element for use in an image-forming process is comprised of a support, an image-forming layer and an electrically-conductive layer whose electrical conductivity is process-surviving and essentially independent of humidity. The electrically-conductive layer is comprised of a vanadium pentoxide colloidal gel, a polyesterionomer binder and a methoxyalkylmelamine.

In a particular embodiment, the invention is directed to a substrate for use as a component of an imaging element, the substrate comprising a support having thereon an electrically-conductive layer comprised of a vanadium pentoxide colloidal gel, a polyesterionomer binder and a methoxyalkylmelamine.

In a further particular embodiment, the invention is directed to a coating composition that is useful for forming an electrically-conductive layer of an imaging element, the coating composition comprising a vanadium pentoxide colloidal gel, a polyesterionomer binder and a methoxyalkylmelamine.

DETAILED DESCRIPTION OF THE INVENTION

The imaging elements of this invention can be of many different types depending on the particular use for which they are intended. Such elements include, for example, photographic, electrostatographic, photothermographic, migration, electrothermographic, dielectric recording and thermal-dye-transfer imaging elements.

Details with respect to the composition and function of a wide variety of different imaging elements are provided in U.S. Pat. No. 5,340,676 and references described therein. The present invention can be effectively employed in conjunction with any of the imaging elements described in the '676 patent.

Photographic elements represent an important class of imaging elements within the scope of the present invention. In such elements, the electrically-conductive layer may be applied as a subbing layer, as an intermediate layer, or as the outermost layer on the sensitized emulsion side of the support, on the side of the support opposite the emulsion, or on both sides of the support.

The support material utilized in this invention can be comprised of various polymeric films, paper, glass, and the like, but, polyester film support, which is well known in the art, is preferred. The thickness of the support is not critical. Support thicknesses of 2 to 10 mil (0.05 to 0.25 millimeters) can be employed, for example, with very satisfactory results. The support material typically employs an - undercoat or primer layer between the antistatic layer and the polyester support. Such undercoat layers are well known in the art and comprise, for example, a vinylidene chloride/methyl acrylate/itaconic acid terpolymer or vinylidene chloride/acrylonitrile/acrylic acid terpolymer.

The antistatic layer of this invention comprises a colloidal gel of vanadium pentoxide as the conductive material. The use of vanadium pentoxide in antistatic layers is described in Guestaux, U.S. Pat. No. 4,203,769. The antistatic layer is prepared by coating an aqueous colloidal solution of vanadium pentoxide, a water-dispersible polyesterionomer binder, and a methoxyalkylmelamine. Preferably, the vanadium pentoxide is doped with silver. Typically the dried coating weight of the vanadium pentoxide antistatic material is about 0.5 to about 50 $mg/m^2$. The ratio of the total weight of the polyesterionomer binder plus methoxyalkylmelamine to the vanadium pentoxide antistatic material is at least 25:1 to insure an impermeable coating and less than 200:1 to yield useful electrical resistivity values before and after film processing (i.e., electrical resistivitiy less than or equal to $5\times10^{11}$ ohms per square).

Methoxyalkylmelamines are well known crosslinking agents for polymers containing hydroxyl, carboxyl, and amide groups. U.S. Pat. Nos. 5,096,975 and 5,198,499, for example, describe electrically-conductive copolymers of vinylbenzene sulfonic acid and a hydroxyl-containing monomer crosslinked with a methoxyalkylmelamine. In the present invention it is not clear whether the improved resistance to permeation by film processing solutions is due to reaction of the methoxyalkylmelamine with the polyesterionomer binder, self-condensation of the methoxyalkylmelamine, or some combination of these two reactions. In the present invention, the weight ratio of polyesterionomer binder to methoxyalkylmelamine is preferably about 4:1 to about 48:1 and more preferably about 4:1 to about 24:1. Use of too little methoxyalkylmelamine deleteriously affects the impermeability of the antistatic layer. However, if an excessive amount of the methoxyalkylmelamine is used it may remain unreacted in the electrically-conductive layer, thus acting as a plasticizer and decreasing the water and chemical resistance of the coating. An acid catalyst such as a mineral acid, an aromatic sulfonic acid, phosphoric acid, alkyl phosphoric acid, etc. may be added to the coating formulation to improve the rate of curing. Preferably the acid catalyst is an aryl sulfonic acid such as p-toluene sulfonic acid. The acid catalyst may be present in an amount of 0.1 to 2% of the total weight of the methoxyalkylmelamine compound.

Any methoxyalkylmelamine may be employed in this invention such as, for example, those multifunctional methoxyalkylmelamines having at least 2 and preferably 3 to 6 methoxyalkyl groups, such as hexamethoxymethylmelamine, trimethoxymethylmelamine, hexamethoxyethylmelamine, tetramethoxyethylmelamine, hexamethoxypropylmelamine, pentamethoxypropylmelamine, trimethoxybutylmelamine, and the like. It is preferred that hexamethoxymethylmelamine be employed.

The term "polyesterionomer" refers to polyesters that contain at least one ionic moiety. Such ionic moieties function to make the polymer water dispersible. These polyesters are prepared by reacting one or more dicarboxylic acids or their functional equivalents such as anhydrides, diesters, or diacid halides with one or more diols in melt phase polycondensation techniques well known in the art (see for example, U.S. Pat. Nos. 3,018,272, 3,929,489, 4,307,174, 4,419,437). Examples of this class of polymers include, for example, Eastman AQ ® polyesterionomers, manufactured by Eastman Chemical Co.

Typically the ionic moiety is provided by some of the dicarboxylic acid repeat units, the remainder of the dicarboxylic acid repeat units are nonionic in nature. Such ionic moieties can be anionic or cationic, but, for the purpose of the present invention the ionic group must be anionic in nature to prevent flocculation of the colloidal vanadium pentoxide antistat. Preferably the ionic dicarboxylic acid contains a sulfonic acid group or its metal salt. Examples include the sodium, lithium, or potassium salt of sulfoterephthalic acid, sulfonaphthalene dicarboxylic acid, sulfophthalic acid, and sulfoisophthalic acid or their functionally equivalent anhydride, diester, or diacid halide. Most preferably the ionic dicarboxylic acid repeat unit is provided by 5-sodiosulfoisophthalic acid or dimethyl 5-sodiosulfoisophthalate. The nonionic dicarboxylic acid repeat units are provided by dicarboxylic acids or their functional equivalents represented by the formula:

$$-\overset{O}{\overset{\|}{C}}-R-\overset{O}{\overset{\|}{C}}-$$

where R is an aromatic or aliphatic hydrocarbon or contains both aromatic and aliphatic hydrocarbons. Exemplary compounds include isophthalic acid, terephthalic acid, succinic acid, adipic acid, and others.

Suitable diols are represented by the formula: HO—R—OH, where R is aromatic or aliphatic or contains both aromatic and aliphatic hydrocarbons. Preferably the diol includes one or more of the following: ethylene glycol, diethylene glycol, or 1,4-cyclohexanedimethanol.

The polyesterionomer binders of the invention preferably comprise from about 1 to about 25 mol %, based on the total moles of dicarboxylic acid repeat units, of the ionic dicarboxylic acid repeat units. Preferably the polyesterionomers have a glass transition temperature ($T_g$) of about 0° C. to 100° C. More preferably, the $T_g$ is about 20° C. to about −80° C.

The use of polyesterionomer dispersions in aqueous coating formulations, for example, inks, has been reported. U.S. Pat. Nos. 4,883,714, 4,.847,316, 4,738,785 and 4,704,309 describe aqueous printing inks using polyesterionomers as a pigment carrier or binder.

U.S. Pat. No. 4,307,174 describes water-dispersible polyester adhesives for photographic materials. U.S. Pat. No. 4,419,437 describes polyesterionomers useful to disperse particulate pigments in, for example, image-forming compositions such as for lithographic plates.

Polyesterionomers have been reported as priming layers on photographic film supports. U.S. Pat. No. 4,883,706 describes a composite polyester film comprising a coating, e.g. a coextruded layer, of a sulfonated polyester adhesion primer on one or both sides of a semicrystalline polyester film substrate. U.S. Pat. No. 4,394,442 describes a subbing layer comprising a water-dispersible polyesterionomer applied to an energy-treated, biaxially-oriented polyester film base. U.S. Pat. No. 4,478,907 discloses a subbing layer for polyester film support comprising a water-dispersible polyesterionomer with a $T_g$ of at least 50° C. derived from ethylene glycol and a mixture of isophthalic acid, a salt of sulfoisophthalic acid, terephthalic acid, and an aromatic dicarboxylic acid. Research Disclosure 241008 describes a dispersion suitable for subbing polyester film support comprised of a polyester containing repeat units derived from a polyhydroxy compound and a mixture of terephthalic acid, isophthalic acid, and a salt of sulfoisophthalic acid in which at least one of the polyhydroxy compounds or diacids contain a $CCl_3$ group. An antistatic layer for a photographic film support consisting essentially of a blockcopolyetherester of dibasic carboxylic acid(s) esterfied with ethylene glycol that may contain a-small amount of sulfo groups in salt form is described in European Patent Application 247648. However, the polyester was not reported to be a binder for an antistatic agent.

U.S. Pat. No. 5,439,785 describes a photographic element comprising antistatic layers of vanadium pentoxide, a sulfopolymer which includes sulfopolyesters, and an adhesion promoting compound. Epoxy silanes are disclosed as the adhesion promoting compound. Examples are described for antistatic layers containing vanadium pentoxide and a sulfopolyester with and without the adhesion promoting epoxy silane compound. The layers reportedly provide antistatic protection after film processing.

The antistatic coating of the invention may be applied onto the film support using coating methods well known in the art such as hopper coating, skim pan/air knife coating, gravure coating, and others. In the drying and curing of the antistatic layer, temperatures of from about 25° C. to about 200° C. may be employed. Preferably a temperature of from about 80° C. to about 140° C. for approximately 3 to 10 minutes is employed.

In addition to the vanadium pentoxide, polyesterionomer binder, methoxyalkylmelamine, and acid catalyst, other ingredients well known in the photographic art may be added to the antistatic coating composition. These include, anionic and nonionic surfactants and wetting aids, matte particles, and lubricants. The antistatic layer of this invention may serve as the outermost layer of an imaging element or it can be overcoated with various types of protective overcoats (for example, cellulose esters, polyurethanes, polyesters, acrylate and/or methacrylate containing interpolymers), gelatin subbing layers, silver halide emulsions, and gelatin curl control layers.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure,* Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure,* Item 36544, September, 1994, and the references listed therein.

The photographic silver halide emulsions utilized in this invention can contain other addenda conventional in the photographic art. Useful addenda are described, for example, in *Research Disclosure,* Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

Although each of the individual components contained in the antistatic layer of this invention is known for use in imaging elements it was unexpected that such a combination of components would provide an antistatic coating composition that has excellent solution stability and freedom from flocculation of the vanadium pentoxide as well as the ability to provide a dried layer whose antistatic properties survive even the most demanding film processing conditions. The invention is further illustrated by the following examples of its practice.

EXAMPLES 1–10

Solution A was prepared by adding 235 grams of a 25.5 weight % dispersion of a polyesterionomer having a $T_g$ of 55° C. (this polyesterionomer is available from Eastman Chemical Co. in solid pellet form as EASTMAN AQ® 55S), 60 grams of hexamethoxymethylmelamine (available as Cymel 303 Resin, Cytec Industries, Inc.), and 10 grams of a 10% solution of Olin 10 G nonionic surfactant to 165 grams of deionized water. This solution was mixed at room temperature for several hours and then used in the following coating formulations.

Solution 1 was prepared by mixing 3.75 grams of a 0.57% silver-doped vanadium pentoxide colloidal dispersion, 35.8 grams of deionized water, 5 grams of the 25.5% polyesterionomer dispersion, 0.07 grams of 6.7% Triton X-100 surfactant (available from Rohm and Haas Company), 3.34 grams of Solution A, and 2 grams of 1% p-toluene sulfonic acid.

Solution 2 was prepared by mixing 3.75 grams of a 0.57% silver-doped vanadium pentoxide colloidal dispersion, 35.8 grams of deionized water, 6.48 grams of the 25.5% polyesterionomer dispersion, 0.07 grams of 6.7% Triton X-100 surfactant (available from Rohm and Haas Company), 1.86 grams of Solution A, and 2 grams of 1% p-toluene sulfonic acid.

Solution 3 was prepared by mixing 3.75 grams of a 0.57% silver-doped vanadium pentoxide colloidal dispersion, 42.1 grams of deionized water, 1.25 grams of the 25.5% polyesterionomer dispersion, 0.07 grams of 6.7% Triton X-100 surfactant (available from Rohm and Haas Company), 0.835 grams of Solution A, and 2 grams of 1% p-toluene sulfonic acid.

Solution 4 was prepared by mixing 3.75 grams of a 0.57% silver-doped vanadium pentoxide colloidal dispersion, 40 grams of deionized water, 2.5 grams of the 25.5% polyesterionomer dispersion, 0.07 grams of 6.7% Triton X-100 surfactant (available from Rohm and Haas Company), 1.67 grams of Solution A, and 2 grams of 1% p-toluene sulfonic acid.

Solution 5 was prepared by mixing 3.75 grams of a 0.57% silver-doped vanadium pentoxide colloidal dispersion, 40.0 grams of deionized water, 3.24 grams of the 25.5% polyesterionomer dispersion, 0.07 grams of 6.7% Triton X-100 surfactant (available from Rohm and Haas Company), 0.93 grams of Solution A, and 2 grams of 1% p-toluene sulfonic acid.

Solution 6 was prepared by mixing 3.75 grams of a 0.57% silver-doped vanadium pentoxide colloidal dispersion, 35.8 grams of deionized water, 6.95 grams of the 25.5% polyesterionomer dispersion, 0.07 grams of 6.7% Triton X-100 surfactant (available from Rohm and Haas Company), 1.40 grams of Solution A, and 2 grams of 1% p-toluene sulfonic acid.

Solution 7 was prepared by mixing 3.75 grams of a 0.57% silver-doped vanadium pentoxide colloidal dispersion, 35.8 grams of deionized water, 7.41 grams of the 25.5% polyesterionomer dispersion, 0.07 grams of 6.7% Triton X-100 surfactant (available from Rohm and Haas Company), 0.93 grams of Solution A, and 2 grams of 1% p-toluene sulfonic acid.

Solution 8 was prepared by mixing 3.75 grams of a 0.57% silver-doped vanadium pentoxide colloidal dispersion, 35.8 grams of deionized water, 7.64 grams of the 25.5% polyesterionomer dispersion, 0.07 grams of 6.7% Triton X-100 surfactant (available from Rohm and Haas Company), 0.70 grams of Solution A, and 2 grams of 1% p-toluene sulfonic acid.

Solution 9 was prepared by mixing 3.75 grams of a 0.57% silver-doped vanadium pentoxide colloidal dispersion, 35.8 grams of deionized water, 7.88 grams of the 25.5% polyesterionomer dispersion, 0.07 grams of 6.7% Triton X-100 surfactant (available from Rohm and Haas Company), 0.47 grams of Solution A, and 2 grams of 1% p-toluene sulfonic acid.

Solution 10 was prepared by mixing 3.75 grams of a 0.57% silver-doped vanadium pentoxide colloidal dispersion, 35.8 grams of deionized water, 7.99 grams of the 25.5% polyesterionomer dispersion, 0.07 grams of 6.7% Triton X-100 surfactant (available from Rohm and Haas Company), 0.35 grams of Solution A, and 2 grams of 1% p-toluene sulfonic acid.

Solution 11 was prepared by mixing 3.75 grams of a 0.57% silver-doped vanadium pentoxide colloidal dispersion, 37.8 grams of deionized water, 8.34 grams of the 25.5% polyesterionomer dispersion, and 0.07 grams of 6.7% Triton X-100 surfactant (available from Rohm and Haas Company). This solution represents a comparative formulation that does not contain the hexamethoxymethylmelamine, but has the polyesterionomer binder and the vanadium pentoxide antistatic material at a weight ratio of 100:1.

Solution 12 was prepared by mixing 2.2 grams of a 0.57% silver-doped vanadium pentoxide colloidal dispersion, 45.7 grams of deionized water, 1.96 grams of the 25.5% polyesterionomer dispersion, and 0.15 grams of 6.7% Triton X-100 surfactant (available from Rohm and Haas Company). This solution represents a comparative formulation analogous to that described in U.S. Pat. No. 5,439,785 to prepare Example 1, film 5. This film was reported to provide antistatic properties after processing in standard KODAK PROCESS C41 film processing.

The above solutions 1 to 12 were coated onto a polyethylene terephthalate support that had been previously coated with a vinylidene chloride-containing terpolymer latex subbing layer. Solutions 1 through 11 were applied at a wet coverage of 24 ml/m$^2$ and solution 12 was applied at a wet coverage of 6 ml/m$^2$. All of the coatings were dried at 100° C. for 3 minutes. The surface resistivity for the coatings at 20% RH was measured using a two-point probe before and after processing in KODAK ULTRATEC processing chemistry. This is a high pH, high temperature film development process that represents a severe test for antistatic performance survivability. The results for the coatings are reported in Table 1.

The results show that coatings of the invention which contain the polyesterionomer, hexamethoxymethylmelamine and vanadium pentoxide provide excellent resistivity values before and after processing. In addition, all of the coating solutions of the invention have excellent stability and form highly transparent films. Comparative coatings that do not contain the hexamethoxymethylmelamine do not provide effective antistatic performance after processing in the KODAK ULTRATEC processing chemistry.

TABLE 1

| Coating | Solution | Polyesterionomer/ Hexamethoxymethylmelamine Weight Ratio | Surface Resistivity Before Processing, ohms per square | Surface Resistivity After Processing, ohms per square |
|---|---|---|---|---|
| Example 1 | 1 | 4/1 | $3.1 \times 16^7$ | $8.0 \times 16^7$ |
| Example 2 | 2 | 8/1 | $4.0 \times 16^7$ | $8.0 \times 10^7$ |
| Example 3 | 3 | 4/1 | $2.5 \times 10^8$ | $7.9 \times 10^{10}$ |
| Example 4 | 4 | 4/1 | $3.2 \times 10^8$ | $6.3 \times 10^9$ |
| Example 5 | 5 | 8/1 | $1.0 \times 10^8$ | $1.0 \times 10^9$ |
| Example 6 | 6 | 12/1 | $2.5 \times 10^8$ | $4.0 \times 10^8$ |
| Example 7 | 7 | 16/1 | $2.5 \times 10^8$ | $3.1 \times 10^8$ |
| Example 8 | 8 | 24/1 | $4.0 \times 10^8$ | $5.0 \times 10^8$ |
| Example 9 | 9 | 32/1 | $4.0 \times 10^8$ | $3.1 \times 10^9$ |
| Example 10 | 10 | 48/1 | $4.0 \times 10^8$ | $3.1 \times 10^{10}$ |
| Comparative 1 | 11 | — | $4.0 \times 10^7$ | $>1 \times 10^{13}$ |
| Comparative 2 | 12 | — | $4.0 \times 10^8$ | $>1 \times 10^{13}$ |

The present invention provides many advantageous features in comparison with the prior art. The unique combination of vanadium pentoxide colloidal gel, polyesterionomer binder and methoxyalkylmelamine crosslinking agent provides a coating composition that has excellent stability against flocculation of the vanadium pentoxide material. In addition, the dried coatings have excellent conductivity both before and after film processing and excellent adherence to underlayers and subsequently applied layers. The invention eliminates the need for a barrier layer overcoat and this reduces manufacturing complexity and cost. Since an overcoat need not provide barrier layer properties, it can be optimized for other properties such as scum control, curl control or antihalation properties. To serve as an effective barrier, it is necessary that an overcoat be hydrophobic but the present invention permits the use of hydrophilic overcoats.

The invention has been described in detail with particular reference to certain preferred embodiments thereof, but it will be understood that variations and modifications can be effected within the spirit and scope of the invention.

We claim:

1. An imaging element for use in an image-forming process; said imaging element comprising a support, an image-forming layer and an electrically-conductive layer; said electrically-conductive layer comprising a vanadium pentoxide colloidal gel, a polyesterionomer binder and a methoxyalkylmelamine.

2. An imaging element as claimed in claim 1, wherein said support is a polyester film.

3. An imaging element as claimed in claim 1, wherein said vanadium pentoxide is doped with silver.

4. An imaging element as claimed in claim 1, wherein the dried coating weight of said electrically-conductive layer is about 0.5 to about 50 $mg/m^2$.

5. An imaging element as claimed in claim 1, wherein the ratio of the total weight of polyesterionomer binder plus methoxyalkylmelamine to vanadium pentoxide is at least 25:1 and less than 200:1.

6. An imaging element as claimed in claim 1, wherein the weight ratio of polyesterionomer binder to methoxyalkylmelamine is from about 4:1 to about 48:1.

7. An imaging element as claimed in claim 1, wherein the weight ratio of polyesterionomer binder to methoxyalkylmelamine is from about 4:1 to about 24:1.

8. An imaging element as claimed in claim 1, wherein said methoxyalkylmelamine has 3 to 6 methoxyalkyl groups.

9. An imaging element as claimed in claim 1, wherein said methoxyalkylmelamine is hexamethoxymethylmelamine.

10. An imaging element as claimed in claim 1, wherein said polyesterionomer has a glass transition temperature of about 20° C. to about 80° C.

11. An imaging element as claimed in claim 1, wherein said element is a photographic element.

12. An imaging element as claimed in claim 1, wherein said element is a photothermographic element.

13. An imaging element as claimed in claim 1, wherein said image-forming layer is a silver halide emulsion layer.

14. A substrate that is useful as a component of an imaging element, said substrate comprising a support having thereon an electrically-conductive layer; said electrically-conductive layer comprising a vanadium pentoxide colloidal gel, a polyesterionomer binder and a methoxyalkylmelamine.

15. A coating composition that is useful for forming an electrically-conductive layer of an imaging element; said coating composition comprising a vanadium pentoxide colloidal gel, a polyesterionomer binder and a methoxyalkylmelamine.

* * * * *